United States Patent

Boeck

[11] 3,874,150
[45] Apr. 1, 1975

[54] IMPLEMENT LEVELING SYSTEM

[75] Inventor: David J. Boeck, Port Washington, Wis.

[73] Assignee: FMC Corporation, San Jose, Calif.

[22] Filed: June 25, 1973

[21] Appl. No.: 373,584

[52] U.S. Cl. .................................. 56/17.1, 56/15.9
[51] Int. Cl. ........................................... H01d 35/26
[58] Field of Search ......... 56/17.1, 17.2, 14.7, 14.9, 56/15.7–15.9

[56] References Cited
UNITED STATES PATENTS
3,077,718  2/1963  McLaughlin ........................ 56/17.1
3,483,682  12/1969  Root ................................... 56/17.2

Primary Examiner—Robert Peshock
Assistant Examiner—J. N. Eskovitz
Attorney, Agent, or Firm—A. J. Moore; C. E. Tripp

[57] ABSTRACT

A system for easily leveling an implement attached to a vehicle and having uneven upper surfaces. The implement, such as a rotary mower, is suspended from a garden tractor, includes a housing having longitudinally and laterally spaced leveling pads formed in its upper surface with the upper surfaces of said pads lying in a common plane parallel to the plane of the mower blades. A spirit level is selectively placed on different ones of the leveling pads, and adjustable leveling devices are then manipulated to cause the housing to pivot about a longitudinal axis and a transverse axis until the plane of the pads, and thus the mower blades, is horizontal.

2 Claims, 7 Drawing Figures

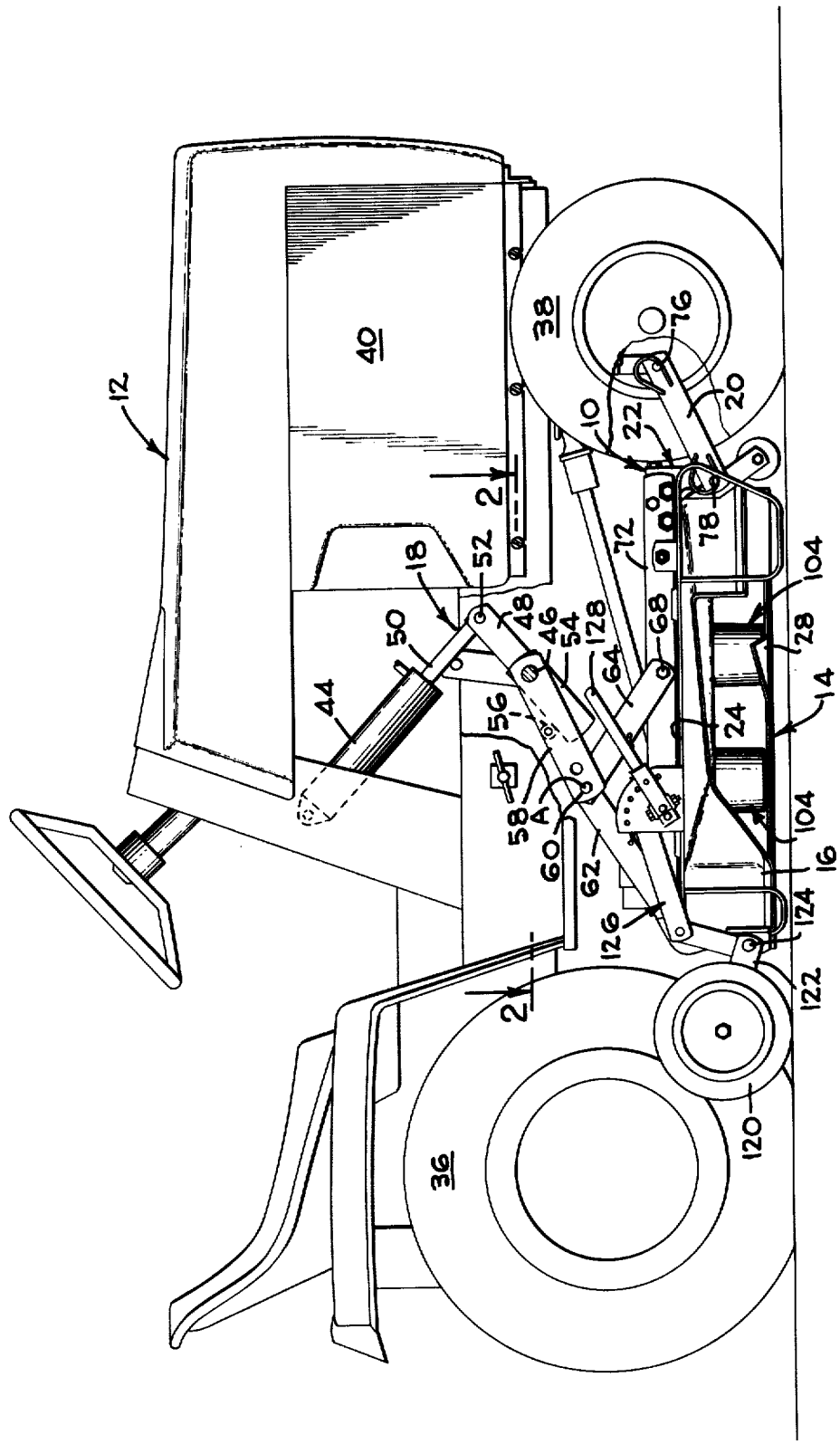

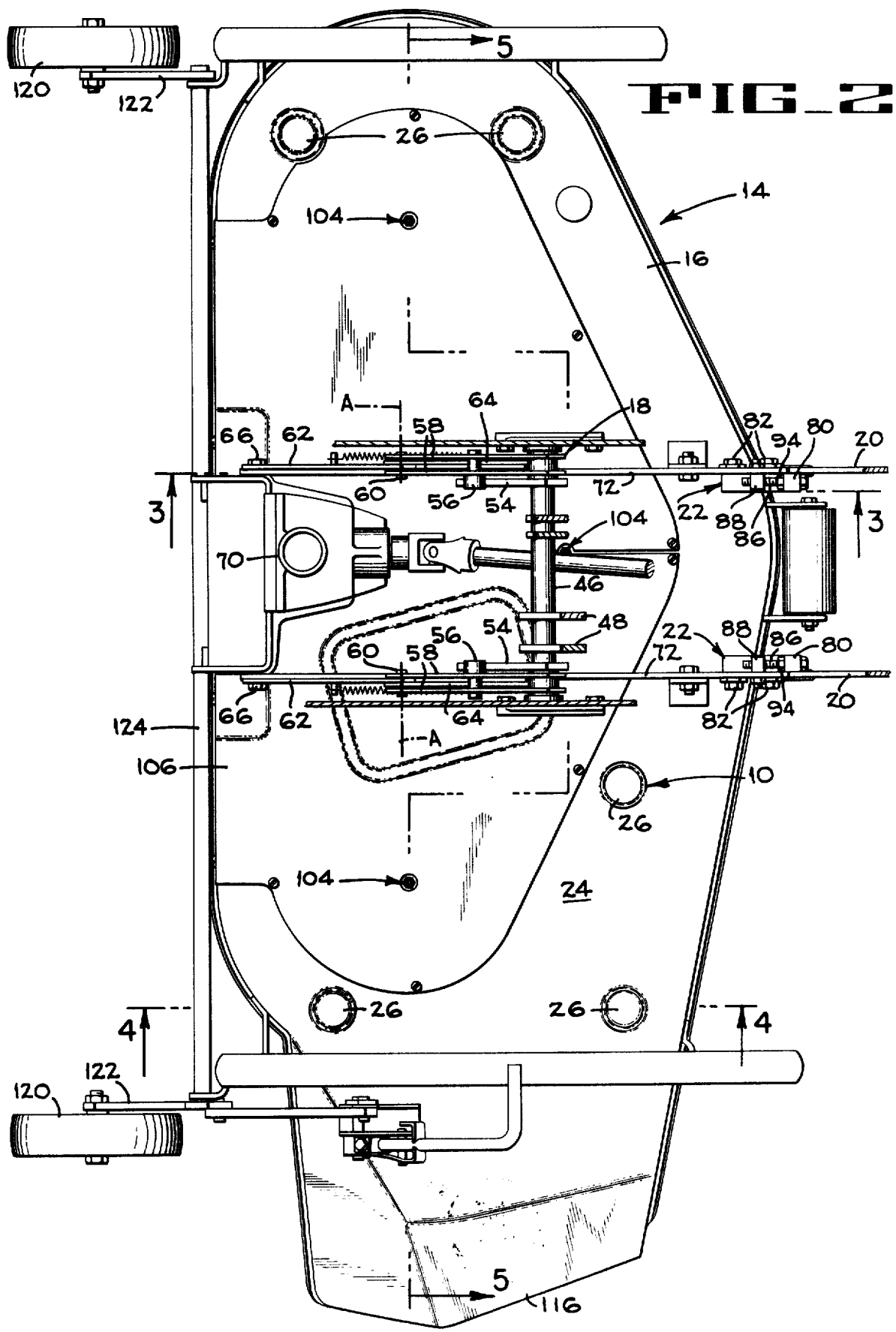

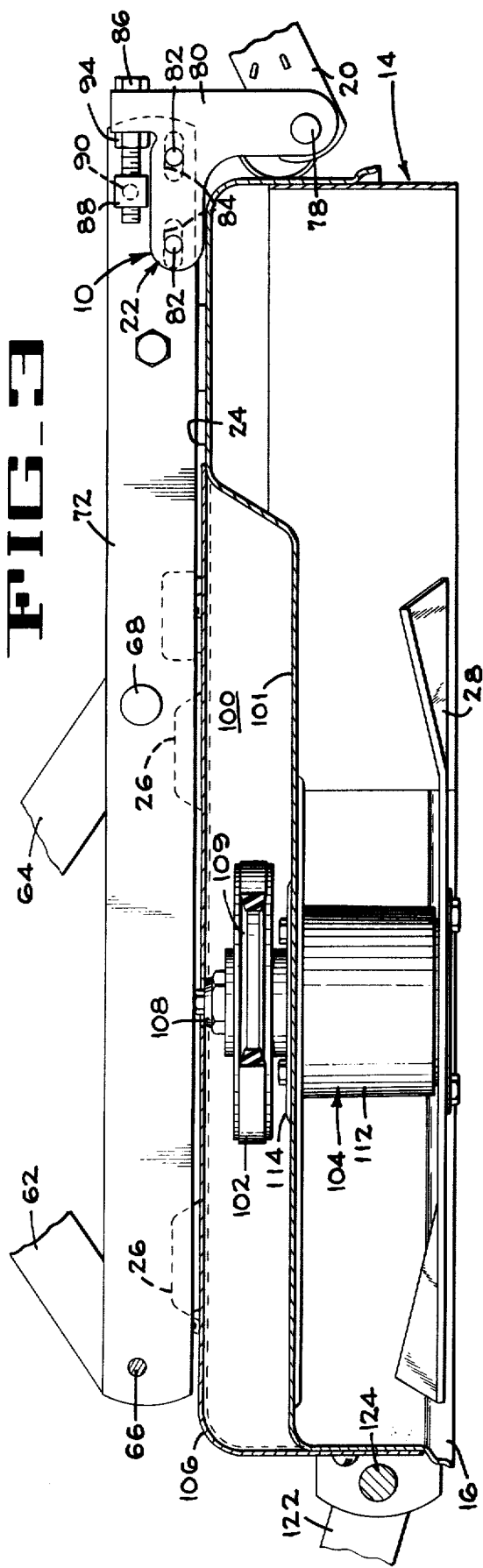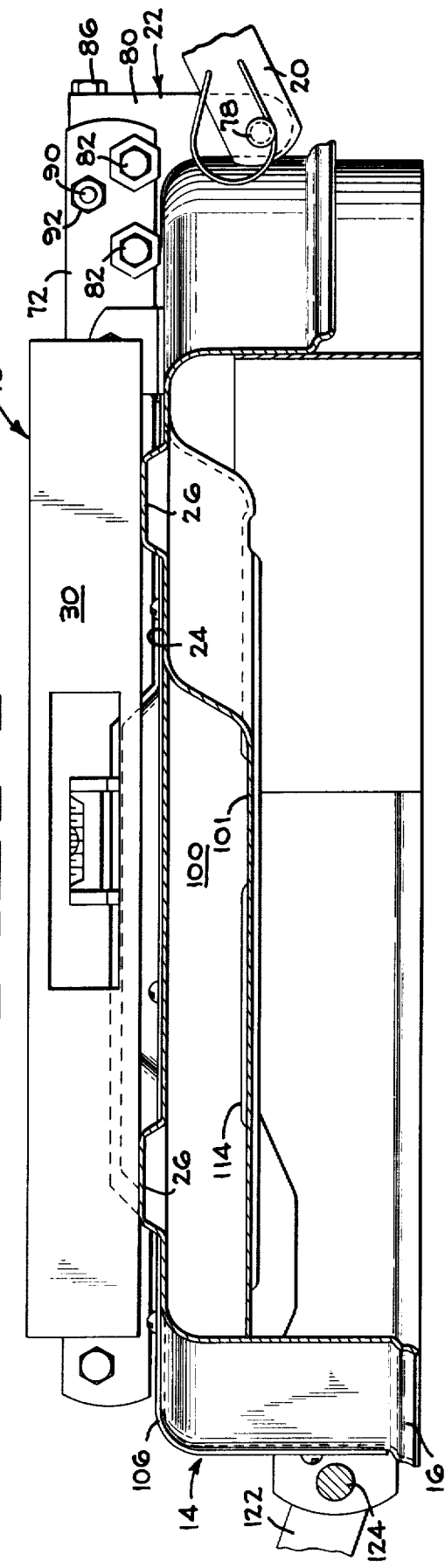

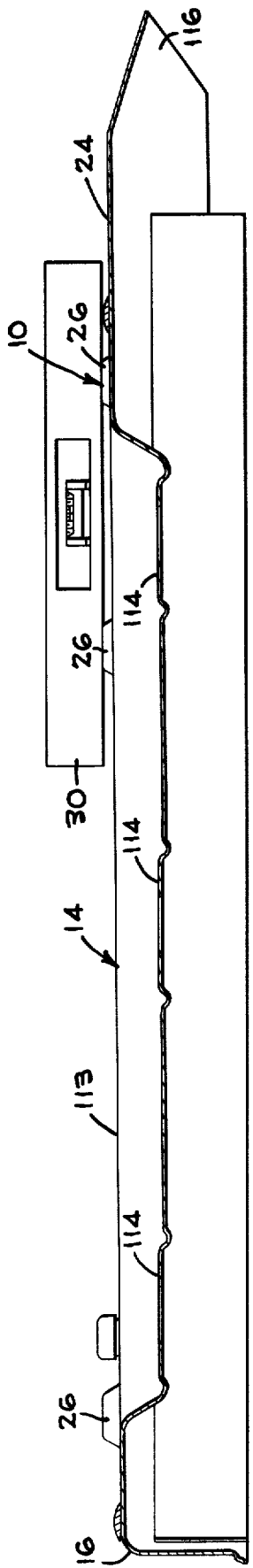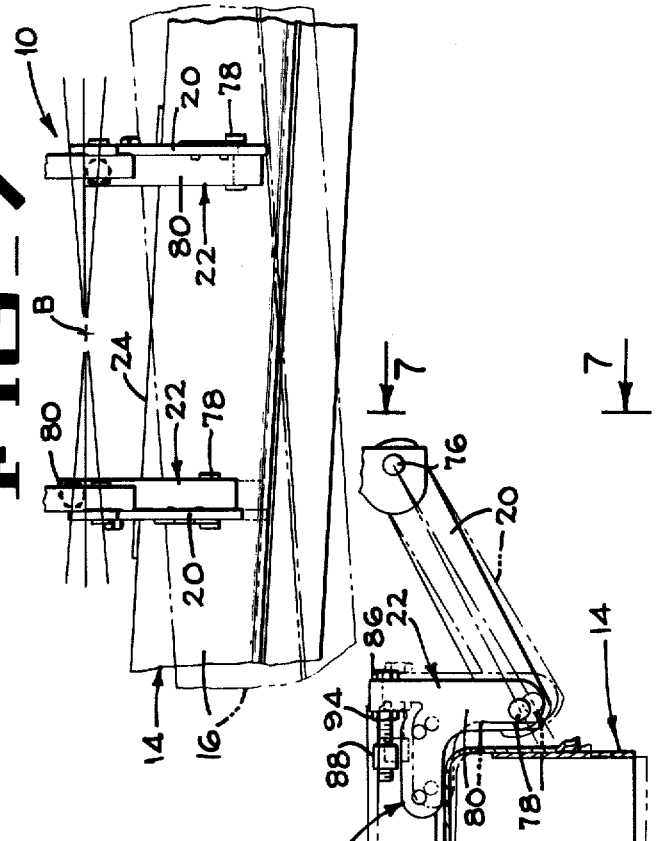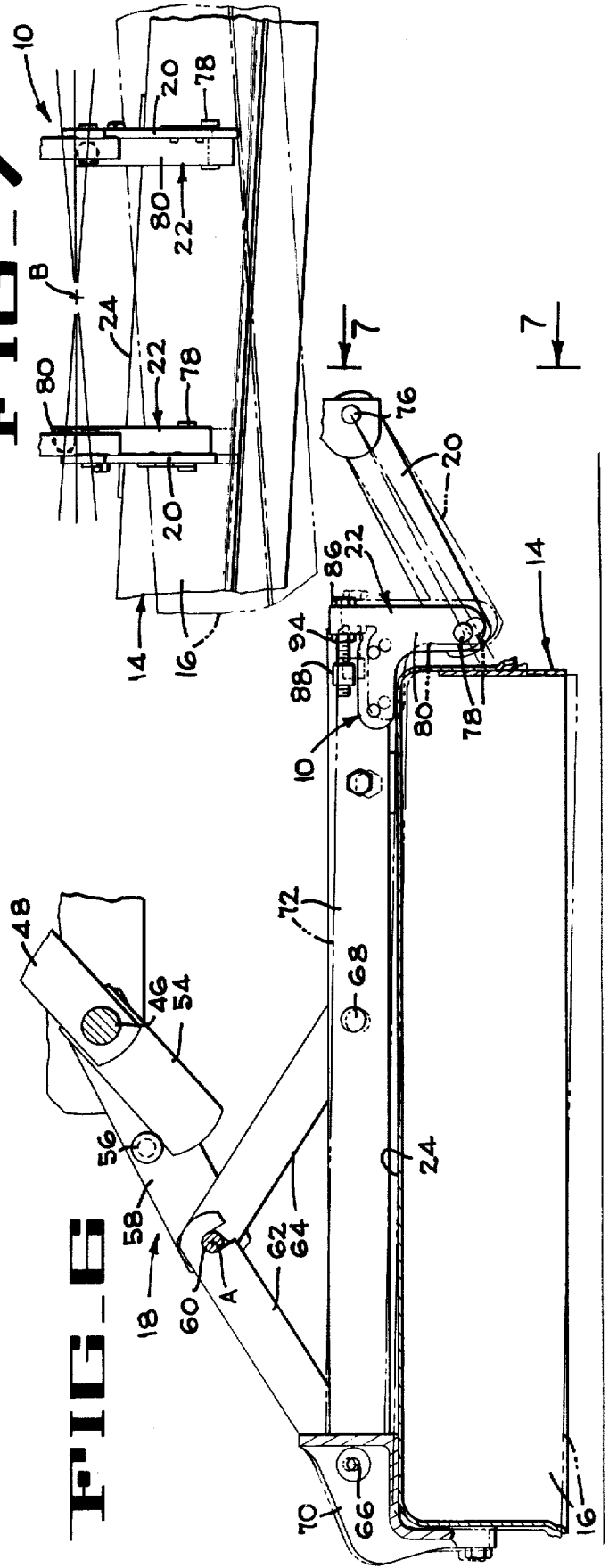

IMPLEMENT LEVELING SYSTEM

CROSS REFERENCE TO RELATED APPLICATIONS

The garden tractor and structure for suspending the mower from the tractor is of the type disclosed in U.S. Federspiel patent applications Ser. No. 307,918 filed Nov. 20, 1972 now U.S. Pat. No. 3,811,338 which issued on May 21, 1974; Ser. No. 312,011 filed Dec. 4, 1972 now U.S. Pat. No. 3,796,028 which issued on Mar. 12, 1974; and Ser. No. 304,173 filed Nov. 6, 1972 now U.S. Pat. No. 3,840,253 which issued on Oct. 8, 1974; and Bacon application Ser. No. 327,353 filed Jan. 29, 1973. All of the above mentioned applications are assigned to the assignee of the present invention.

BACKGROUND OF THE INVENTION

1. Field of the Invention

This invention pertains to implement supporting garden tractors and more particularly relates to a method and apparatus for easily leveling such implements when suspended from the tractors.

2. Description of the Prior Art

Garden tractors of the type disclosed in the aforementioned applications which support large multi-bladed mowers are well known in the art. Since the housings of the mowers are quite large and since their upper walls or decks are uneven, with some decks being inclined upwardly a few degrees toward the grass discharge side thereof, it has become quite difficult to mount the mowers of the tractor so that the cutting planes of all of the cutters lie in a common horizontal plane.

SUMMARY OF THE INVENTION

In accordance with the implement leveling system of the present invention, a plurality of upwardly projecting pads are extruded into the deck of the mower housing with the upper surface of all pads lying in a common reference plane. The tools for extruding these pads are adjustable to vary the heights of the extruded leveling pads so that the tools may be used with several different sizes and styles of mower housings and to take material thickness variations into consideration. The housings are stamped and extruded from sheet metal and include mower spindle mounting pads which are parallel to the reference plane. Mower spindles are bolted to the spindle mounting pads and their cutters are normal to the spindle axes and accordingly parallel to the reference plane. Thus, leveling of the reference plane will also level the cutting plane of the blades or cutters.

The implement leveling system also includes a pair of laterally spaced mower leveling devices which are adjusted equal amounts in opposite directions to cause the mower to pivot about a longitudinal axis until the mower is level transversely, and which are then adjusted equal amounts in the same direction to raise or lower the front of the mower about a transverse axis until the mower is leveled longitudinally of the direction of movement of the tractor.

It is, therefore, one object of the present invention to provide a method of easily leveling a large implement with uneven upper surfaces such as a mower.

Another object is to provide an apparatus for leveling a vehicle supported implement such as a mower or the like.

BRIEF DESCRIPTION OF THE DRAWINGS

FIG. 1 is a side elevation of a garden tractor having a multi-blade rotary mower connected thereto, certain parts being cut away.

FIG. 2 is a horizontal section taken substantially along the lines 2—2 of FIG. 1 illustrating the upper surface of the mower housing and a portion of the tractor's implement lift system.

FIG. 3 is an enlarged vertical section taken along lines 3—3 of FIG. 2 illustrating one of the leveling devices.

FIG. 4 is an enlarged vertical longitudinal section taken along lines 4—4 of FIG. 2 illustrating a carpenters level positioned on two of the leveling pads.

FIG. 5 is a transverse section taken along lines 5—5 of FIG. 2 illustrating the mower housing with the upper cover removed and with a slight inclination toward the open right end as indicated by the height of the leveling pads, a spirit or carpenters level being positioned on two of the pads.

FIG. 6 is a diagrammatic operational view in vertical longitudinal section illustrating the mower housing and one of the leveling devices in phantom lines prior to being leveled and in solid lines after being leveled, the mower spindles and cutters being removed.

FIG. 7 is a diagrammatic operational view looking in the direction of arrow 7—7 of FIG. 6, illustrating the manner in which the two leveling devices may be adjusted to cause the mower to pivot in either direction about a longitudinally extending axis until it is transversely level.

DESCRIPTION OF THE PREFERRED EMBODIMENT

The implement leveling system 10 (FIGS. 1 and 2) of the present invention is illustrated, described, and claimed in connection with a garden tractor 12 and a multi-bladed rotary mower 14 carried by the tractor. It will be understood, however, that the scope of the invention is to be construed broadly enough to cover the other types of vehicles and implements.

In general, the implement leveling system 10 comprises a wide mower housing 16 which has its rear end supported on the tractor 12 by a hydraulically operated lift mechanism 18 and has its forward end supported by a pair of spaced drag links 20 connected between the tractor frame and a pair of transversely spaced leveling devices 22. The mower housing 16 is quite wide and is formed from sheet metal with a plurality of different shaped and levels by a stamping and extruding process. The uneven housing design is provided for accommodating belt drives, cutter spindles, grease fittings, and also for providing a pleasing appearance for customer acceptance. Because the upper surface or deck 24 of the housing is uneven and cannot be relied upon for providing reliable reference points for leveling, leveling pads 26 (FIGS. 2 and 5) are extruded into the housing in accordance with the present invention. The leveling pads are extruded into the housing when the housing is being formed, and the upper surfaces of the pads lie in a common plane parallel to the plane of the mower blades or cutters 28. Thus, by leveling the reference plane with the aid of the leveling devices 22 and a spirit or carpenters level 30, the cutters 28 will also be leveled thereby greatly reducing the tendency of one or more of the cutters from "scalping" the area being mowed.

More particularly, the tractor 12 includes the usual pair of driven rear wheels 36 and front steerable wheels 38; and an engine 40 which supplied power to the rear wheels 36, to the mower blades 28, and to a hydraulic pump (not shown) which supplies fluid under pressure to a hydraulic ram 44 of the lift mechanism 18.

The lift mechanism 18 includes a pivot shaft 46 (FIGS. 1, 2 and 6) journaled on the frame of the tractor and keyed to a lever 48. The lever 48 (FIGS. 1 and 2) is pivotally connected to the piston rod 50 of the hydraulic ram 44 by a pin 52, and upon actuation of the ram pivots the shaft and two spaced pick-up arms 54 keyed thereto. The pick-up arms 54 engage abutment pins 56 secured to pairs of spaced parallel lift arms 58 which are pivotally supported on the shaft 46. As shown in FIGS. 2 and 6, each pair of arms 58 include a lift pin 60, having a pair of links 62 and 64 removably hooked thereto. The opposite ends of the links 62 and 64 are pivoted about cap screws 66 and 68 (FIGS. 2 and 6) that are rigidly secured to the housing of a right angle gear box 70 and to a pair of spaced mounting straps 72, respectively. The straps are rigidly secured to the mower housing 24. Thus, the rear end of a mower 14 is suspended by the lift mechanism 18 for transverse movement about the axis A (FIG. 6) of the lift pin 60. The axis A of the lift pin 60 is disposed horizontally when the tractor is supported on a horizontal surface and the tires are properly inflated.

The front end of the mower 14 is supported by the drag links 20 each of which is pivoted at one end to the frame of the tractor by a pin 76 (FIGS. 1 and 6), and at the other end to the associated leveling device 22 by a pin 78. Each leveling device 22 (FIGS. 4 and 6) comprises a generally T-shaped body 80 which is threaded to receive cap screws 82 extending through horizontal slots 84 in the associated mounting strap 72. An elongated horizontal adjusting screw 86 is slidably received in an opening in the T-shaped body and is threaded into a stationary block 88 having a threaded portion 90 that extends through a hole in the associated straps 72 and is secured to the strap 72 by a nut 92 (FIG. 4). By loosening the cap screws 82 and a lock nut 94 on the adjusting screw 86, it will be apparent that the associated leveling device 22 may be moved a short distance longitudinally of the mounting strap 72.

It will be noted that the drag links 20 (FIG. 6) and the lift arms 58 cooperate to define a parallelogram linkage on each side of the tractor when in the solid line position illustrated in FIG. 6 since the arms and links are parallel and since their lengths between pivot points are equal. The mower 14 once leveled, will ramin level while supported by the lift mechanism 18 because of the parallelogram linkage support. Although movement of the leveling devices 22 from the illustrated position in order to level the mower may move the drag links 20 slightly out of parallelism with the lift arms 58, the degree of misalignment will be so slight as to be ineffective to significantly alter the level attitude of the mower as it is raised and lowered by the lift mechanism 18.

As mentioned previously and as best illustrated in FIGS. 2 to 5, the mower housing 16 is of stamped and extruded construction and its upper surface or deck 24 does not present a reliable reference plane for supporting a spirit level or the like. A large portion of the upper surface 24 of the mower housing is extruded downwardly to provide a recess 100, partially defined by a lower deck 101, for receiving certain V-belt drives 102 and the upper portions of the mower spindles 104. The recess 100 is closed by a cover 106 bolted to the housing 24.

Each spindle 104, three being illustrated in the drawings, includes a vertical shaft 108 (FIG. 3) having a sheave 109 keyed to its upper end, and a cutter blade 28 bolted to the lower end. The shaft 108 is journaled by bearings (not shown) within a bearing housing 112 which is bolted to associated spindle mounting pads 114 (FIG. 5) stamped and pressed into the lower deck 101. In many of the larger mower housings, the intended plane of the upper deck 24 and lower deck 101 are inclined upwardly, as indicated by the upper deck line 113 (FIG. 5), several degrees toward the discharge end 116 of the mower. Thus, the spindle mounting pads 114 and the upper surfaces of the leveling pads 26 likewise must be angled relative to the deck surface. Such inclination is indicated in FIG. 5 by the difference in height of the pads 26.

As is well known in the art, the height of the mower blades above the ground is controlled by a gauge wheel 120 (FIGS. 1 and 2) for most mowing operations. In the illustrated mower, the gauge wheels 120 are journaled on arms 122 secured to a transversely elongated gauge wheel shaft 124 that is journaled in the mower housing 16. A linkage 126 may be operated by a lever 128 to lock the wheel 120 at mower cutting heights of between about 1 and 5 ½ inches. The mower may also be raised above the 5 ½ inch level to a transport position by full extension of the hydraulic ram 44.

In operation of the implement leveling system 10 of the present invention, the tractor 12 is first driven onto level ground or a level floor with all of its tires properly inflated. The mower 14 is then connected to the drag links 20 and the lift mechanism 18, and the lift mechanism is then actuated to lift the mower completely off the floor.

The operator then places the spirit level 30 onto transversely aligned leveling pads 26 as indicated in FIG. 5. Assuming that the mower 14 is not transversely level, then the two capscrews 82 (FIG. 4) and the lock nut 94 (FIG. 6) on each leveling device are loosened to permit adjustment of the devices. In order to cause the front of the mower 14 to pivot about the centrally disposed, longitudinal axis B (FIG. 7) the adjusting screws 86 (FIG. 6) of the two adjusting devices 22 are turned equal amounts in opposite directions until the level 30 indicates that the mower housing 16 is transversely level.

In order to level the mower 14 longitudinally of the direction of movement of the tractor, the gauge wheels 120 are set at the three inch cutting height and the mower is then lowered by the lift mechanism 18 for support by the gauge wheels. The spirit level 30 is then placed across the two longitudinally aligned leveling pads 26 on either side of the mower is indicated in FIG. 4. The adjusting screws 86 of the leveling devices 22 are then screwed the same amount in the same directions to pivot the mower about transverse axis A of the pin 60 (FIG. 6) thereby longitudinally leveling the mower 14 while not disturbing its transverse attitude. After the mower has been leveled, the capscrews 82 and lock nuts 94 are securely tightened. Since the upper surfaces of the leveling pads 26 and the plane of the rotary cutter blades 28 are parallel, it follows that the cutter blades also lie in the desired horizontal plane.

From the foregoing description it is apparent that the implement leveling system of the present invention includes the concept of extruding leveling pads in a sheet metal housing during formation of the housing by stamping and extruding processes. Because the housing is quite large and has uneven upper surfaces which makes leveling quite difficult, the leveling pads provide a planar surface upon which a spirit level may be placed. A pair of adjusting devices are provided to easily adjust the housing so that it pivots about a central longitudinal axis to laterally level the implement, and pivots about a transverse axis to longitudinally level the implement.

Although the best mode contemplated for carrying out the present invention has been herein shown and described, it will be apparent that modification and variation may be made without departing from what is regarded to be the subject matter of the invention.

I claim:

1. In a vehicle supported mower provided with a housing having a deck to which a plurality of cutter spindles are secured with a cutter on each spindle and with all cutters mounted for rotation in a common cutter plane, and attachment means including a power operated lift mechanism connecting the mower to the vehicle for movement between a lowered mowing position and a raised transport position, the improvement which comprises: a plurality of longitudinally and transversely spaced leveling pads on the deck of said mower housing and having their upper surfaces lying in a common reference plane disposed parallel to said cutter plane, said leveling pads being adapted to removably receive and support a spirit level selectively placed on different ones of said pads for determining when the reference plane is longitudinally and transversely level, leveling means for pivoting the mower about longitudinal and transverse axes unitl longitudinally and transversely level as indicated by the spirit level, said attachment means including means defining a pair of transversely spaced parallelogram linkages each having a pair of parallel arms and wherein said leveling means includes a pair of transversely spaced leveling devices attached to associated ones of said linkages and arranged when adjusted to pivot one arm of each of said parallelogram linkages slightly out of parallelism with its other arm thereby causing the mower to pivot about at least one axis relative to the vehicle until the reference plane is determined to be level, longitudinally extending mounting straps rigidly secured to the mower housing, each leveling device being adjustably secured between an arm of said associated parallelogram linkage and an associated strap for longitudinal sliding movement relative to said associated strap, an adjusting screw connected between said straps and said leveling devices for adjusting said devices, and means for locking said devices in adjusted position.

2. In a vehicle supported mower provided with a housing having a deck to which a cutter spindle is secured with a cutter on said spindle and with the cutter mounted for rotation in a cutter plane, and attachment means including a lift mechanism connecting the mower to the vehicle for movement between a lowered mowing position and a raised transport position, the improvement which comprises: a plurality of longitudinally and transversely spaced leveling pads on the deck of said mower housing and having their upper surfaces lying in a common reference plane disposed parallel to said cutter plane, said leveling pads being adapted to removably receive and support level detecting means selectively placed on different ones of said pads for determining when the reference plane is longitudinally and transversely level, leveling means for pivoting the mower about longitudinal and transverse axes until longitudinally and transversely level as indicated by the level detecting means, said attachment means including means defining a pair of transversely spaced parallelogram linkages, each having a pair of normally parallel arms and wherein said leveling means includes a pair of transversely spaced leveling devices attached to associated ones of said linkages and arranged when adjusted to pivot one arm of each of said parallelogram linkages slightly out of parallelism with its other arm thereby causing the mower to pivot about at least one axis relative to the vehicle until the reference plane is determined to be level, longitudinally extending mounting straps rigidly secured to the mower housing, each leveling device being adjustably secured between an arm of said associated parallelogram linkage and an associated strap for longitudinal sliding movement relative to said associated strap, and adjusting screw connected between said straps and said leveling devices for adjusting said devices, and means for locking said devices in adjusted position.

* * * * *